United States Patent
Lee et al.

(10) Patent No.: US 11,847,122 B2
(45) Date of Patent: *Dec. 19, 2023

(54) UNIQUE SQL QUERY TRANSFER FOR ANOMALY DETECTION

(71) Applicant: International Business Machines Corporation, Armonk, NY (US)

(72) Inventors: Cheng-Ta Lee, Taipei (TW); Chun-Shuo Lin, Taipei (TW); Galia Diamant, Littleton, MA (US); Richard Ory Jerrell, Littleton, MA (US); Leonid Rodniansky, Littleton, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/711,687

(22) Filed: Apr. 1, 2022

(65) Prior Publication Data

US 2022/0222259 A1   Jul. 14, 2022

Related U.S. Application Data

(63) Continuation of application No. 16/748,783, filed on Jan. 21, 2020, now Pat. No. 11,334,569.

(51) Int. Cl.
   *G06F 16/245* (2019.01)
   *G06F 16/2455* (2019.01)
(52) U.S. Cl.
   CPC .. *G06F 16/24564* (2019.01); *G06F 16/24556* (2019.01); *G06F 16/24561* (2019.01)

(58) Field of Classification Search
   None
   See application file for complete search history.

(56) References Cited

U.S. PATENT DOCUMENTS

| | | | | |
|---|---|---|---|---|
| 6,694,321 | B1* | 2/2004 | Berno | G06F 16/252 |
| 7,840,556 | B1* | 11/2010 | Dayal | G06F 16/2453 |
| | | | | 707/999.003 |
| 2005/0065965 | A1 | 3/2005 | Ziemann et al. | |
| 2007/0289019 | A1 | 12/2007 | Lowrey | |
| 2014/0283096 | A1* | 9/2014 | Neerumalla | G06F 16/24564 |
| | | | | 726/26 |
| 2014/0298471 | A1* | 10/2014 | Feng | G06F 16/24 |

(Continued)

FOREIGN PATENT DOCUMENTS

| | | |
|---|---|---|
| CN | 104123497 A | 10/2014 |
| CN | 104090941 B | 8/2017 |
| CN | 108875366 A | 11/2018 |

OTHER PUBLICATIONS

List of IBM Patents or Patent Applications Treated as Related, May 18, 2022.

(Continued)

*Primary Examiner* — Son T Hoang

(57) ABSTRACT

An example operation may include one or more of receiving a set of structured query language (SQL) queries from one or more software applications, generating a set of SQL syntax trees that correspond to the set of SQL queries, identifying a unique subset of SQL syntax trees among the generated set of SQL syntax trees based on previously obtained SQL syntax trees, and transmitting the unique subset of SQL syntax trees to a computing system.

18 Claims, 6 Drawing Sheets

(56) References Cited

U.S. PATENT DOCUMENTS

| | | |
|---|---|---|
| 2017/0251000 A1* | 8/2017 | Anantharaju ......... G06F 16/951 |
| 2018/0351986 A1* | 12/2018 | Johns ................ G06F 16/24556 |
| 2019/0102390 A1 | 4/2019 | Antunes et al. |
| 2019/0207969 A1 | 7/2019 | Brown |
| 2019/0207974 A1 | 7/2019 | Jas et al. |
| 2019/0306191 A1* | 10/2019 | Chen ................. G06F 16/24561 |
| 2019/0372924 A1 | 12/2019 | Waltz et al. |
| 2019/0384863 A1* | 12/2019 | Sirin .................... G06F 16/258 |
| 2021/0191942 A1 | 6/2021 | Arnold |

OTHER PUBLICATIONS

Cheng-Ta Lee et al., "Unique SQL Query Transfer for Anomaly Detection", U.S. Appl. No. 16/748,783, filed Jan. 21, 2020.

* cited by examiner

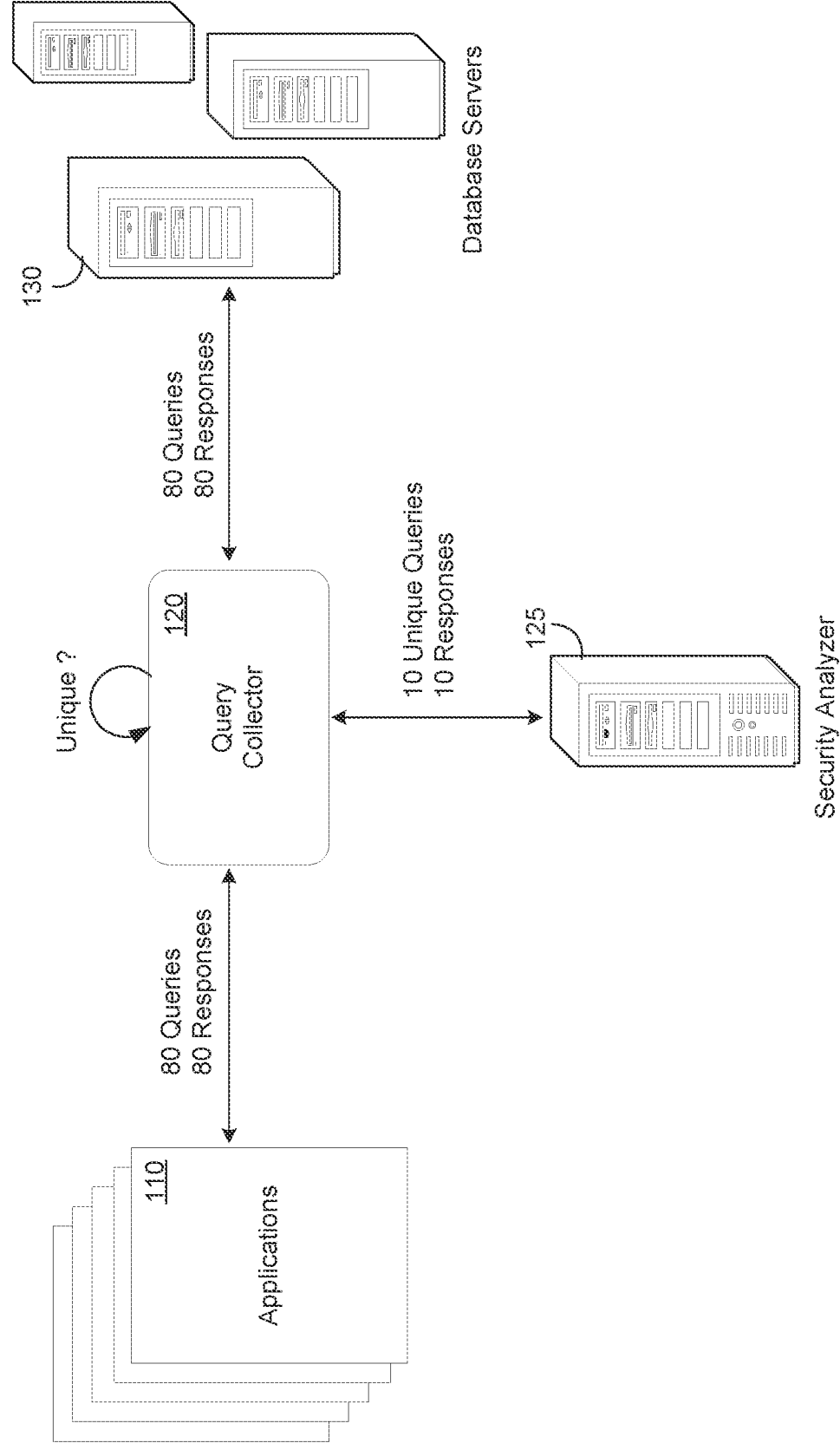

UNIQUE SQL QUERY TRANSFER FOR ANOMALY DETECTION

TECHNICAL FIELD

This application generally relates to database protection, and more particularly, to a system which converts SQL queries into SQL syntax trees and monitors for potential anomalies based on the uniqueness of SQL syntax trees thereby reducing data volume transmitted between a database and a monitoring system.

BACKGROUND

A database protection system can be used to discover suspicious behavior and terminate database connections when an anomaly or violation is detected. Recently, data protection systems have been incorporated into cloud environments. In this architecture, SQL statements (e.g., queries) sent to the database are logged and transferred to the cloud for evaluation by a centrally managed monitoring system. For larger systems, the data volume being fed to the cloud can be significant. However, simple compression of the data can also obscure content of the query making it difficult to analyze. As such, what is needed is a solution that improves and overcomes these drawbacks and limitations.

SUMMARY

One example embodiment may provide an apparatus that includes a processor configured to one or more of receive a set of structured query language (SQL) queries from one or more software applications, generate a set of SQL syntax trees that correspond to the set of SQL queries, and identify a unique subset of SQL syntax trees among the generated set of SQL syntax trees based on previously obtained SQL syntax trees, and a network interface configured to transmit the unique subset of SQL syntax trees to a computing system.

Another example embodiment may provide a method that includes one or more of receiving a set of structured query language (SQL) queries from one or more software applications, generating a set of SQL syntax trees that correspond to the set of SQL queries, identifying a unique subset of SQL syntax trees among the generated set of SQL syntax trees based on previously obtained SQL syntax trees, and transmitting the unique subset of SQL syntax trees to a computing system.

A further example embodiment may provide a non-transitory computer readable medium comprising instructions, that when read by a processor, cause the processor to perform one or more of receiving a set of structured query language (SQL) queries from one or more software applications, generating a set of SQL syntax trees that correspond to the set of SQL queries, identifying a unique subset of SQL syntax trees among the generated set of SQL syntax trees based on previously obtained SQL syntax trees, and transmitting the unique subset of SQL syntax trees to a computing system.

BRIEF DESCRIPTION OF THE DRAWINGS

FIG. 1 is a diagram illustrating a database protection system that sends unique SQL queries to a central platform according to example embodiments.

DETAILED DESCRIPTION

Figure 2A:
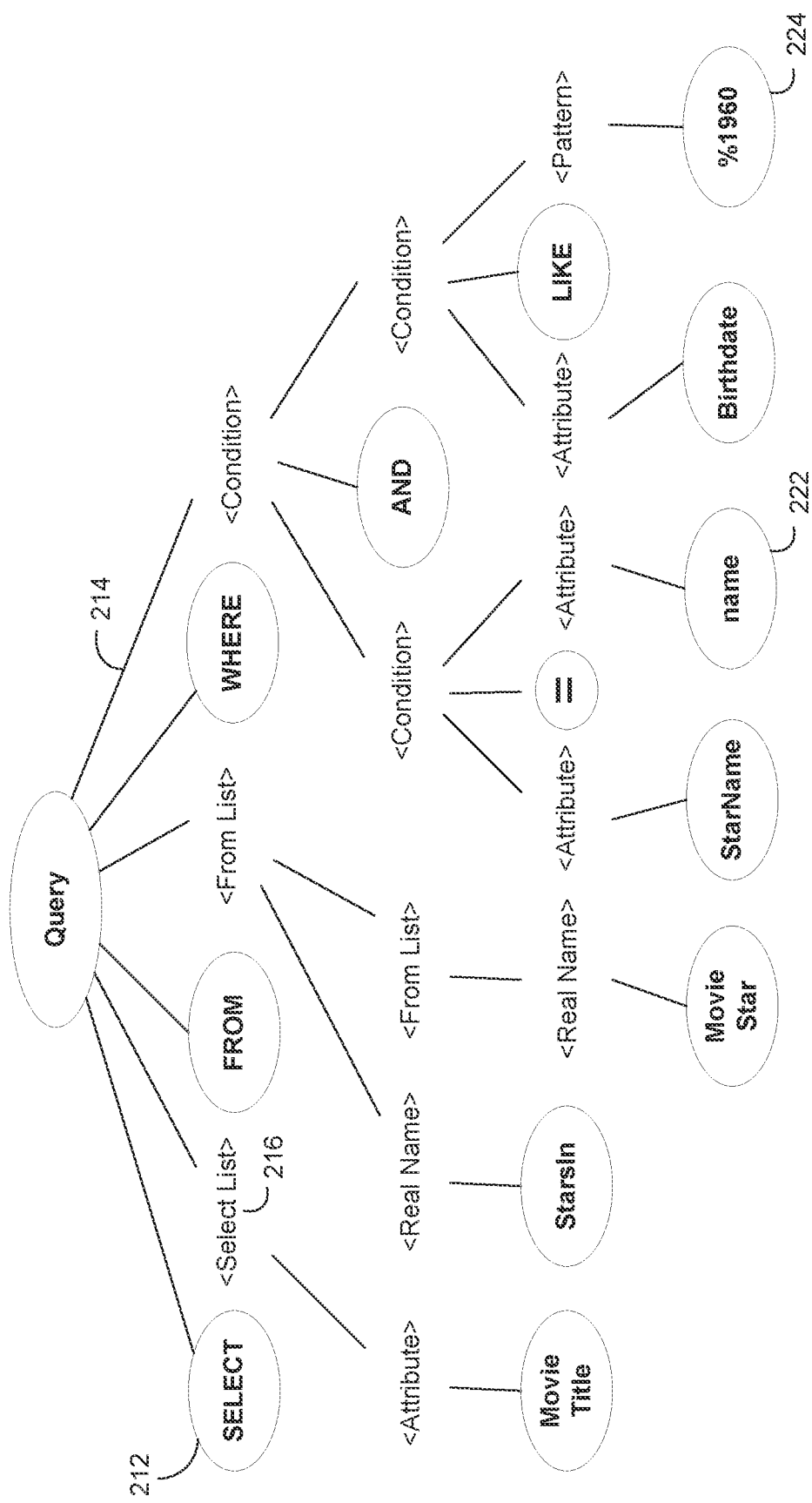
FIG. 2A is a diagram illustrating an SQL syntax tree representing a SQL query according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Database protection systems may provide automated sensitive data discovery and classification, real-time data activity monitoring and cognitive analytics to discover unusual activity around sensitive data. The system may protect against unauthorized data access by learning regular user access patterns and providing real-time alerts when suspicious activities are detected. The system can dynamically block access or quarantine user IDs to protect against internal and external threats and also help streamline and automate compliance workflows. The system may be designed with a scalable architecture that provides full visibility on data activity across the database.

For example, a database protection system may monitor transactions such as structure query language (SQL) requests to identify suspicious behavior, and terminate a connection with an application or other system when an anomaly or a violation is detected. It is common for the database protection system to include a collector which is implemented in conjunction with the database (e.g., running on the database, a standalone system, etc.) which collects SQL queries and sends the collected data to a central analyzing system which is implemented at a server, a cloud platform, or the like. The transfer process can be challenging because the system needs to log and transfer all the SQL statements used by an application to the centrally managed location which can then audit the database usages. For larger systems and applications, the data volume can be significant resulting in high bandwidth consumption and delay in incident response.

The anomaly detection process may be run by an analyzer program at the centrally managed location, such as the cloud. The analyzer may run at various intervals which may be predefined or may be conditionally-based. The anomaly detection process may analyze SQL queries over a predetermined period of time to determine whether a condition has been satisfied (e.g., an excessive number of attempts to access a particular data table, etc.). The conditions may represent patterns of suspicious behavior. If the condition is satisfied, the analyzer may output an alert and/or take additional action such as to disconnect or termination a session with a system or application involved with the suspicious behavior, perform another analysis more frequently, store query context, and the like.

Related attempts to reduce the data volume of the SQL queries being sent back to the centrally managed location in the cloud use data compression which is agnostic to query context. This results in some of the content within the SQL query being obscured, hidden, or the like. Other related attempts offload part of the logics in the data protection analysis to the edge (database location) which creates a bigger footprint (overhead) on the edge. Therefore, it is difficult to achieve a proper balance between the edge and the cloud.

The example embodiments overcome these drawbacks by only sending unique SQL queries from the database to the centrally managed location (e.g., in the cloud, etc.) for auditing and anomaly detection. Meanwhile, SQL queries that are not unique can be stored without being transferred to the cloud. According to various embodiments, a query collector may convert an SQL query to a SQL syntax tree which includes nodes and links representing a structure of the SQL query. The query collector may compare the SQL syntax tree to previously obtained SQL syntax trees of known SQL queries to determine whether the SQL syntax tree is unique or is already known. When the query collector determines the SQL syntax tree is unique, the query collector can transfer the unique SQL syntax tree to an analyzer such as located in the cloud platform for anomaly detection. Here, the known SQL queries may be queries that have been determined as safe, or non-threatening. Meanwhile, the new/unique SQL query may be a possible security threat. Therefore, the new/unique SQL query should be further analyzed.

However, for SQL syntax trees that are not unique, the query collector may store the SQL syntax tree and collect statistics, but may not send the SQL syntax tree to the cloud thereby reducing the amount of SQL queries that are transmitted to the cloud. Furthermore, rather than transmit the entire SQL syntax tree to the cloud, the query collector may encode the SQL syntax tree into an encoded value with only the new variables and a template identifier being forwarded to the analyzer. Thus, the amount of content needed to be transferred for each SQL query is also reduced.

The example embodiments leverage the concept of a unique SQL query (USQ) to identify high-value (suspicious) SQL queries. Rather than transfer all queries to the central cloud platform, only the unique SQL queries may be transferred such that the data volume that needs to be processed in the cloud is much lower and anomaly detection is more accurate. Rather than perform a string comparison to identify identical SQL statement, the example embodiments may use an SQL syntax tree that does not require an identical match in statement content. Rather, two SQL statements can have the same syntax tree but with different parameters, and they are identical in terms of USQ.

The example embodiments apply to different uses cases. For example, in a domain name system (DNS) analytic environment, it is unusual to see a new domain in DNS queries when the environment is stable. For example, once the environment is stable, new domains are usually only added gradually over time (i.e., not hundreds or thousands within a short period of time). Also, the number of new domains queried by an endpoint is a useful indicator of suspicious behavior. The example embodiments can apply the same concept in database security, including detecting how many unique SQL queries the database sees from a database application or in a database deployment. In this example, a surge of unique SQL queries can be an indicator of different factors. For example, the surge may indicate that a database application has been updated/changed. However, the surge may also indicate that a database application is hacked, and it is accessing a database server in a different manner to steal data.

The example embodiments may also be applied to detection of injection attacks when the target of the injection is a database system itself. In this example, an injection attack will create unique SQL queries but its distance (difference) from existing known SQL queries may be very small. In this case, the example embodiments can detect even a slight change based on a normal profile tree which is created from previous SQL queries. It is hard for any injection to bypass this detection.

The example embodiments may also be used to compress SQL queries. For example, the data being sent from the query collector could just be the ID of a syntax tree template along with parameters (strings, numerals, etc.). In this case, the system does not need to attach every parameter but only the necessary ones. For example, if a policy of the query collector was directed towards a specific table in the database, then the collector may only the identifier of the syntax tree along with the table name. By leveraging USQ, the example embodiments can combine data compression and anomaly detection together.

The database protection system described herein may enforce security policies on a database system, including usage monitoring, personally identifiable information (PII) detection/protection, data masking, SQL injection detection, anomaly detection, and the like. For example, in a PII protection system, the example embodiments may identify a certain structure of SQL query that never reveals PII, then it can instruct the local collector to not send similar SQL queries to the cloud in the future.

There are related solutions in DPS which collect local SQL queries and send them to the cloud for analysis, but the problem is bandwidth consumption and the additional latency. Meanwhile, in the example embodiments, the local query collector may filter the SQL queries and only send data about the unique (high-value) SQL queries to the cloud. To identify the high value queries, the example embodiments use a SQL syntax tree to identify a unique SQL structure that the system has never handled before, hence the example embodiments use the concept of an SQL query hash. It is more than just string comparison, but involves the structure of the query. As further described herein, the structure of the SQL syntax tree may include a tree structure with nodes that are connected via links. The example embodiments use the structure of the SQL syntax tree for purposes of comparison rather than just a simple text/string comparison. Once the system starts collecting unique SQL queries from local collectors, the system can run a new tier of analysis on top of them.

FIG. 1 illustrates a database protection system 100 in which unique SQL queries are transferred to a central platform according to example embodiments. Referring to FIG. 1, the system 100 includes database applications 110 accessing a database 130. According to various embodiments, a database protection system which includes a query collector 120 and a security analyzer 125, may reside on a communication path/channel between the database applications 110 and the database 130. Here, the query collector 120 may intercept the traffic between the database applications 110 and the database 130, including database queries and database responses. The database collector 120 may include a software program which is installed within the database 130. As another example, the database collector 120 may be a separate node that resides on the communication path between the database applications 110 and the database 130.

The database protection system may be implemented as a service. However, sending every SQL query from the query collector 120 disposed at the database (edge) to the central platform (cloud) can be expensive. Furthermore, when both queries and responses are sent, the system doubles the latency. Therefore, it is beneficial to reduce the data if possible. However, traditional compression also reduces the quality of the content being sent back making it more difficult (less accurate) to identify anomalies at the security analyzer 125. The example embodiments overcome this difficulty through the use of SQL syntax trees (e.g., shown in FIGS. 2A and 3). The query collector 120 may receive a SQL query (e.g., SQL statement with SQL clauses) and convert the SQL query into a SQL syntax tree.

The query collector 120 may also store or otherwise have access to known SQL syntax trees corresponding to known SQL queries. The known SQL queries may represent normal queries that lack suspicious activity; however, embodiments are not limited thereto. The query collector 120 may determine whether an SQL query is a unique query that should be sent back to the security analyzer 125, or whether the SQL query is known, and should not be sent back. In this case, the query collector 120 may compare the SQL syntax tree of a SQL query with respect to known SQL syntax trees to make such a determination. For example, if the SQL syntax tree is not included in the known SQL syntax trees, the query collector 120 may forward the SQL syntax tree of the new SQL query to the security analyzer 125. Otherwise, the query collector may store the SQL syntax tree and capture statistics for other uses.

In this example, the database applications 110 transmit a set of 80 database queries (e.g., SQL queries) and receive 80 responses. In the example embodiments, a set of database queries may be zero or one or more database queries. The database collector 120 may transfer database queries and responses to the security analyzer 125 for anomaly detection and/or other analysis. However, rather than transfer all SQL queries/responses to the security analyzer 125, the query collector 120 may identify and send only unique SQL queries. In this example, the query collector 120 identifies a subset of 10 SQL queries/responses that are unique and transfers only the identified subset of 10 SQL queries/responses without transmitting all 80 SQL queries and responses.

FIG. 2A illustrates an SQL syntax tree 200 representing a SQL query according to example embodiments. Referring to FIG. 2A, items (e.g., statements, clauses, operators, parameters, etc.) from an SQL query are assigned to nodes 212 in the SQL syntax tree 200. For example, clauses may include a SELECT statement, FROM, WHERE, HAVING, GROUP BY, ORDER BY, etc. In addition, operators such as AND, LIKE, and equals (=) are also assigned to nodes 212. In addition, table names and field names are also assigned to nodes 212. In the example of FIG. 2A, the SQL syntax tree 200 includes a root node 202 representing an identifier of the query, and thirteen nodes 212 representing the structure (items) of the SQL query. The SQL syntax tree 200 also includes content values 216 representing the data values that are associated with some of the nodes 212 in the SQL query. In addition, links 214 provide connections between the nodes 212 and the content values 216. In this example, the nodes 212 may be used by a query collector to identify whether a SQL query is unique or not.

In this example, the SELECT statement indicates one or more fields (column names) of a table from where records are to be selected. Meanwhile, the FROM clause identifies a table name of the table from where the columns of records are to be selected. The WHERE clause identifies a condition that is used to filter the records. For example, the WHERE clause may indicate a specified condition that must be fulfilled for the record to be extracted. Other examples of SQL terms include AND, OR, NOT, etc. which are operators that can be used to filter records. Other examples include LIKE which is an operator that can be used in a WHERE clause to search for a specified pattern. In the example of FIG. 2A, the following SQL query is converted into the SQL syntax tree 200.

```
SELECT  MovieTitle
FROM    StarsIn, MovieStar
WHERE   starName = name
AND     birthdate LIKE '%1960'
```

In the example embodiments, the query collector may identify and collect unique SQL syntax trees. The query collector may receive a SQL query and generate its corresponding SQL syntax tree. The query collector may then determine whether the SQL syntax tree is unique by comparing the SQL syntax tree to known SQL syntax trees. For example, the query collector may compare the tree structure of the SQL syntax tree 200 in FIG. 2A to structures of known SQL syntax trees to determine whether the SQL query corresponding to the SQL syntax tree 200 is unique or known. One of the benefits of this system is that the query collector reduces the amount of data to be transmitted by only sending back unique SQL syntax trees, but also provides a new way to identify anomalies. The number of unique SQL queries should be relatively small in a stable application.

In a related art, a database protection system collects SQL queries on a local database server, and sends everything to the cloud for analysis. In contrast, in the example embodiments, the local query collector may filter SQL queries before they are uploaded to the security analyzer in the cloud. The query collector may remove duplicate queries which have already been seen by the system. For example, the query collector may compare a structure of a SQL syntax tree of an SQL query to structures of SQL syntax trees of known SQL queries. If the structure of the SQL syntax tree (i.e., the nodes) is a match to a structure of a syntax tree of a known SQL query, the query collector may filter out the SQL query/syntax tree so that the known SQL query/syntax tree is not transmitted to the query analyzer. These queries may be normal queries that do not reflect possible suspicious activity.

By performing deduplication of already seen SQL queries, the system can significantly reduce the amount of queries being analyzed by the security analyzer, and also reduce transmission bandwidth. Furthermore, the system can avoid round-trip communication between inspector and analyzer thereby reducing latency. Here, the deduplication may initially be performed by the query collector disposed at the edge (database). In some embodiments, another tier of deduplication may be performed in the cloud by the security analyzer or other program after the unique SQL queries from different clients are collected.

Meanwhile, if a structure of the SQL syntax tree is not known (i.e., it is unique), the query collector may transfer the SQL syntax tree of the SQL query to the security analyzer in the cloud. Accordingly, the database protection system described herein may collect unique SQL syntax trees. Furthermore, the cloud may store the SQL syntax trees for further analysis. In addition, the security analyzer may apply anomaly detection on the unique SQL syntax trees.

Figure 2B:
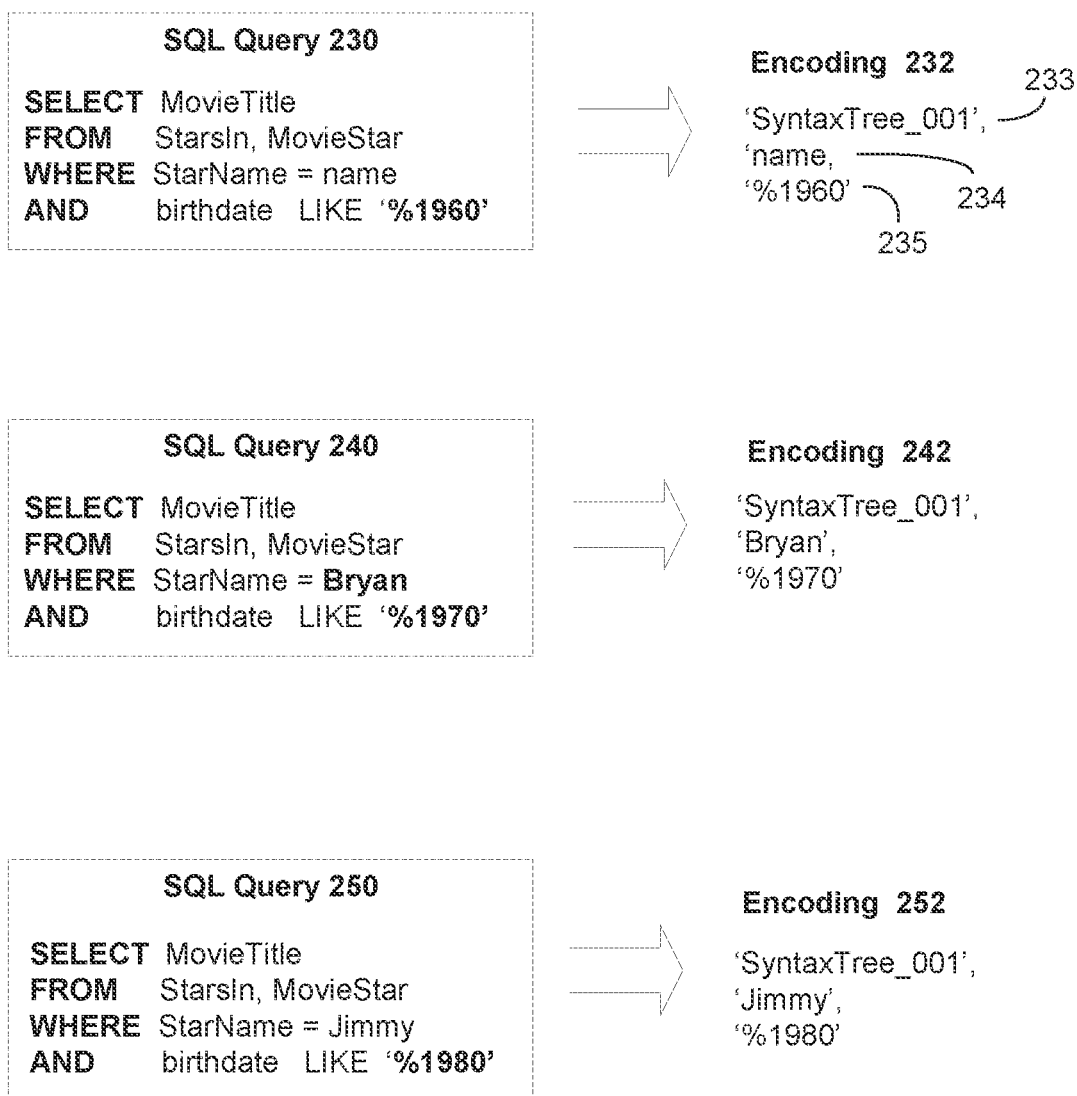
FIG. 2B is a diagram illustrating a process of converting a SQL query into an encoded value based on an SQL syntax tree according to example embodiments.

In addition, as further shown in the example of FIG. 2B, it is not necessary for the query collector to send back the entire SQL syntax tree of a unique SQL query. Rather, the query collector may encode the data being fed back using known SQL syntax tree profiles (or templates) which include a number of similar nodes. Here, the query collector can encode the SQL syntax tree using an identifier of a syntax tree profile from among a plurality of syntax tree profiles, and then send the encoded data. The encoding is similar to creating a hash function for SQL query, so every unique SQL query has a unique hash value.

As shown in FIG. 2A, the SQL syntax tree 200 includes two parameters 222 and 224 which can change based on the user input. Here, the SQL syntax tree 200 may correspond to a syntax tree profile with dynamic/changing parameters 222 and 224. Referring to FIG. 2B, three SQL queries 230, 240, and 250 are shown. Although each of the three SQL queries 230, 240, and 250 are different, they can be encoded using the same syntax tree profile.

Referring to FIG. 2B, SQL query 230 includes a parameter StarName='name', and a parameter birthdate LIKE '%1960'. In this example, the parameter values 'name' and '%1960' are the dynamic values of the parameters 222 and 224 shown in FIG. 2A. Meanwhile, the remainder of the SQL query 230 corresponds to a known syntax tree profile (SyntaxTree_001). Accordingly, the query collector may encode the content of the SQL query 230 into the encoded data 232 which includes an identifier 233 of the profile syntax tree, SyntaxTree_001, and identifiers 234 and 235 of the two dynamic parameter values ('name') and ('%1960'), respectively.

Meanwhile, when a similar SQL query 240 is received with different dynamic parameter values of StarName='Bryan' and birthdate LIKE '%1970', the query collector can generate an encoding 242 which includes an identifier of the profile syntax tree, SyntaxTree_001, and different identifiers for the dynamic parameters. Likewise, when a similar SQL query 250 is received with a StarName='Jimmy' and birthdate LIKE '%1980', the query collector can generate an encoding 252 which includes an identifier of the profile syntax tree, SyntaxTree_001, and the different identifiers for the dynamic parameters. The query collector may store a group of profile trees which can be used to encode commonly used SQL queries with slight changes (e.g., changes in parameter values, etc.). Thus, the content of the SQL syntax tree can be transferred with just a profile tree identifier and values of the dynamic parameters.

Figure 3:
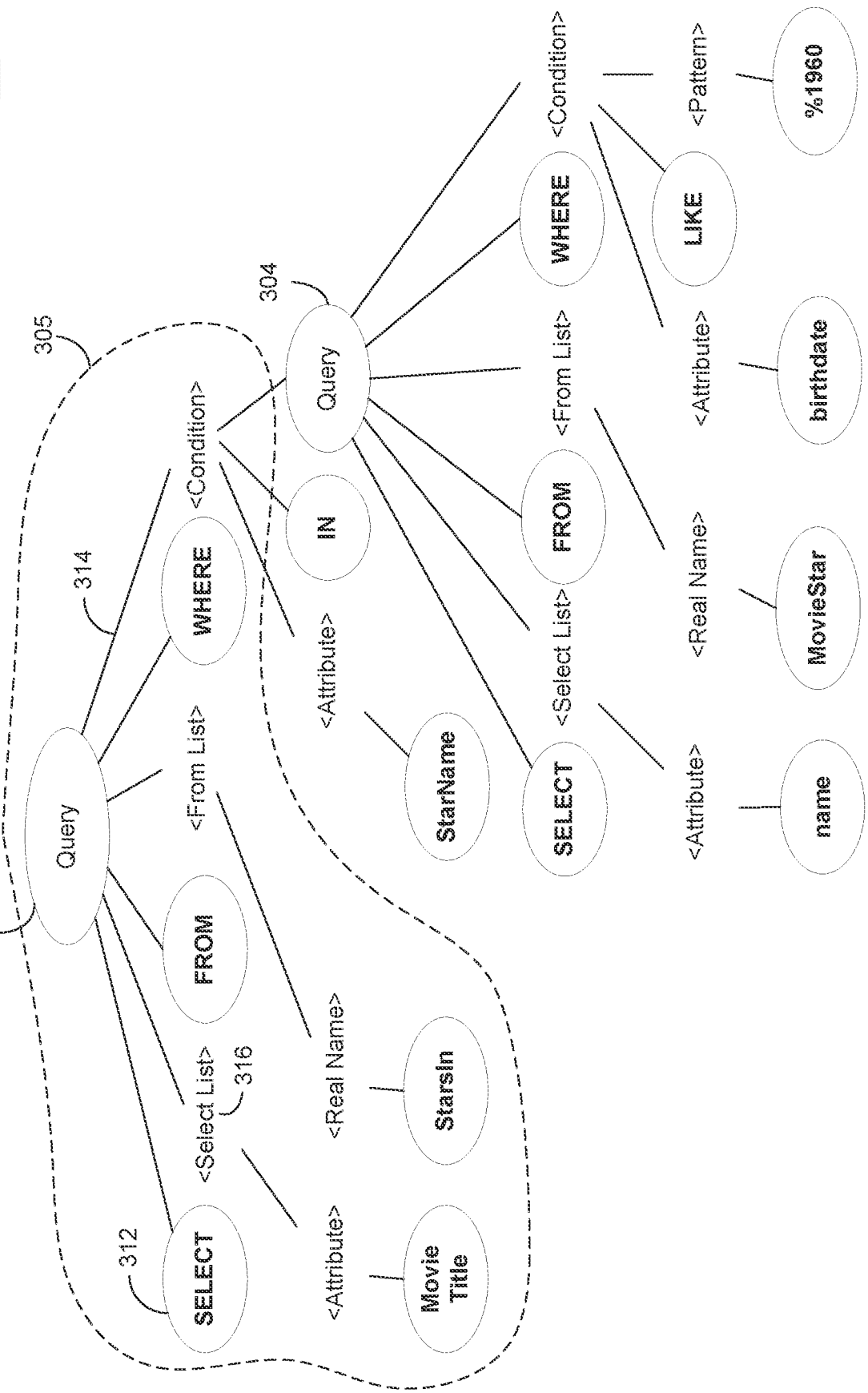
FIG. 3 is a diagram illustrating another example of a SQL syntax tree according to example embodiments.

FIG. 3 illustrates another example of a SQL syntax tree 300 according to example embodiments. Referring to FIG. 3, the SQL syntax tree 300 includes a first query 302 with nodes 312 connected by links 314. In addition, the first query 302 includes a nested query 304 which also includes nodes and links that are chained from the query 302. In this example, a portion 305 of the SQL syntax tree 300 may represent a normal profile tree. In other words, this portion 305 may represent a SQL syntax tree that corresponds to normal access/behavior which is learned by the system from historical SQL queries (known SQL queries). The query collector or other software may build the normal profile tree based on normal SQL queries collected over time from a production environment.

Meanwhile, the sub-query 304 may represent an additional portion that is different from the normal profile tree. Here, the query collector may use a chaining concept and can create linkages between unique SQL queries. The additional sub-query 304 and its nodes create a new profile for SQL analysis. The query collector can calculate a distance between the normal profile and the new syntax tree to detect anomalies such as injection attack.

Figure 4:
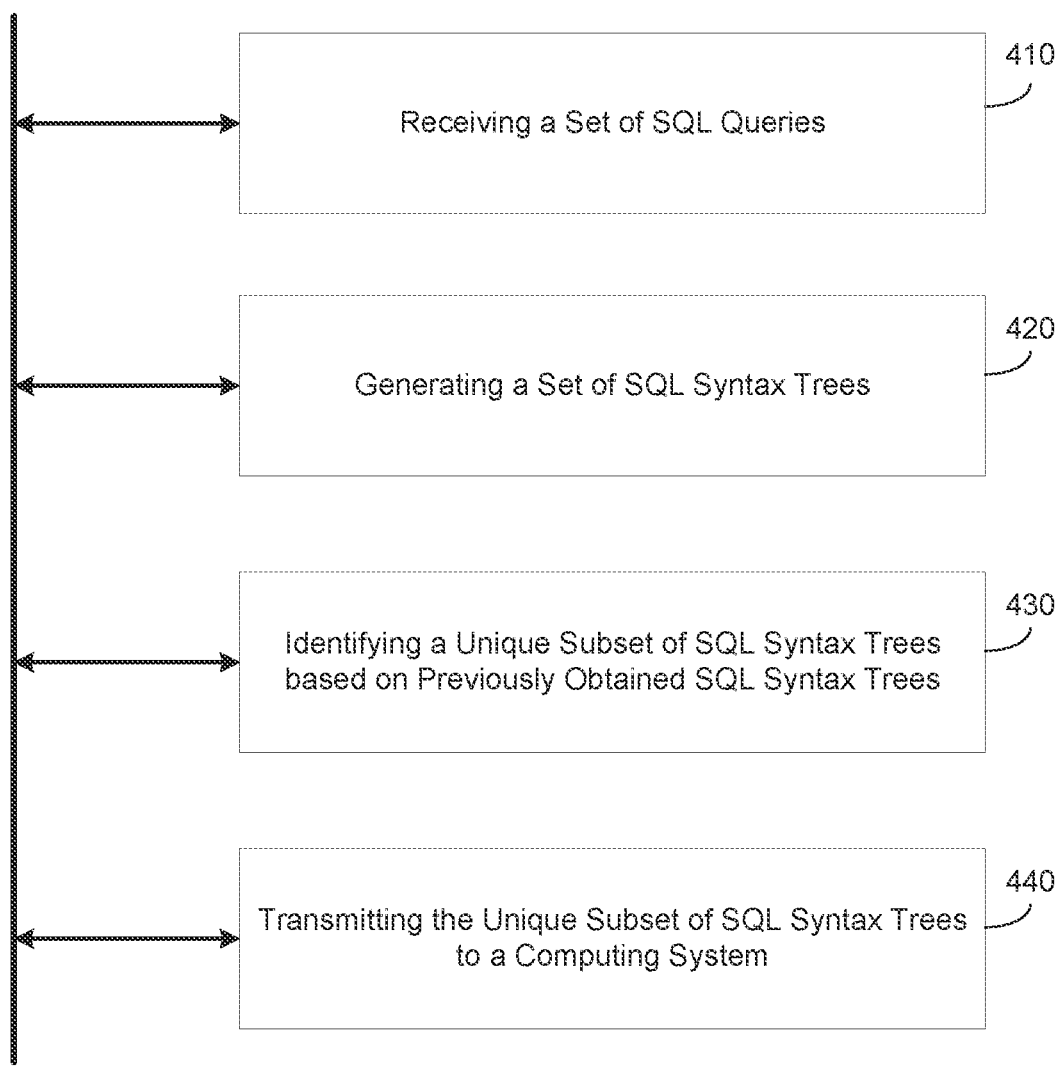
FIG. 4 is a diagram illustrating a method of identifying unique SQL queries according to example embodiments.

FIG. 4 illustrates a method 400 of identifying unique SQL queries according to example embodiments. For example, the method 400 may be performed by a collector that is installed within a database, a server, a cloud platform, a computing system, or the like. Referring to FIG. 4, in 410 the method may include receiving a set of structured query language (SQL) queries from one or more software applications. For example, the SQL queries may be transmitted from one or more database applications running locally on the database, which connect to the database via a network, and/or the like. The SQL queries may include SQL statements requesting access to data stored within a table, a column, a row, or the like of the database.

In 420, the method may include generating a set of SQL syntax trees that correspond to the set of SQL queries, respectively. For example, the method may include converting the content of each SQL query into a respective SQL syntax tree in which clauses of the SQL statement are mapped to nodes in the tree, and the nodes are connected with links to indicate the relationship between the clauses. For example, an identifier of the query may be mapped to a root node, a SELECT statement/clause may be mapped to a node, a FROM clause may be mapped to a node, a WHERE clause may be mapped to a node, and the like. The content (variables, expressions, etc.) within each of the clause may be mapped to their own nodes in the syntax tree.

In 430, the method may include identifying a unique subset of SQL syntax trees among the generated set of SQL syntax trees based on previously obtained SQL syntax trees. For example, the system may store a list of known SQL syntax trees corresponding to known SQL queries. The system may identify any new (unique) SQL query that the system has yet to detect based on a structure of its SQL syntax tree. In 440, the method may include transmitting any unique SQL syntax trees to a computing system such as a data protection system, an anomaly analyzing system, and the like, which may be stored within a cloud platform, a server, a database, and the like. For example, a subset of the set of SQL queries may be identified as unique based on structures of the respective SQL queries with respect to the previously collected SQL syntax trees, and the system may transmit only the unique subset of SQL syntax trees to the computing system, rather than the entire set of SQL syntax trees.

In some embodiments, the generating may include, for each SQL query, generating a SQL syntax tree in which parts of the SQL query are assigned to nodes in the SQL syntax tree. In some embodiments, the identifying may further include identifying a SQL syntax tree that is a duplicate of a previously obtained SQL syntax tree, and filtering out the duplicate SQL syntax tree from the set of SQL syntax trees to generate the unique subset of SQL syntax trees and such that the duplicate SQL syntax tree is not transmitted to the computing system. In some embodiments, the method may further include storing a plurality of profile syntax trees, where each profile syntax tree comprises a predefined SQL syntax tree template.

In some embodiments, the transmitting may include compressing a unique SQL syntax tree into an encoded value that comprises an identifier of a profile syntax tree from among the plurality of profile syntax trees and one or more unique parameter values, and transmitting only the encoded value of the SQL syntax tree to the computing system. In some embodiments, the method may further include building a profile syntax tree of a normal SQL query based on the set of SQL syntax trees. In this example, the identifying may include determining a SQL syntax tree that is unique based on a difference between a structure of the SQL syntax tree with respect to a structure of the profile syntax tree of the normal SQL query. In some embodiments, the identifying may include removing SQL syntax trees from the set of SQL syntax trees that are stored in the previously obtained SQL syntax trees to generate the subset of unique SQL syntax trees.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 5 illustrates an example computer system architecture 500, which may represent or be integrated in any of the above-described components, etc.

Figure 5:
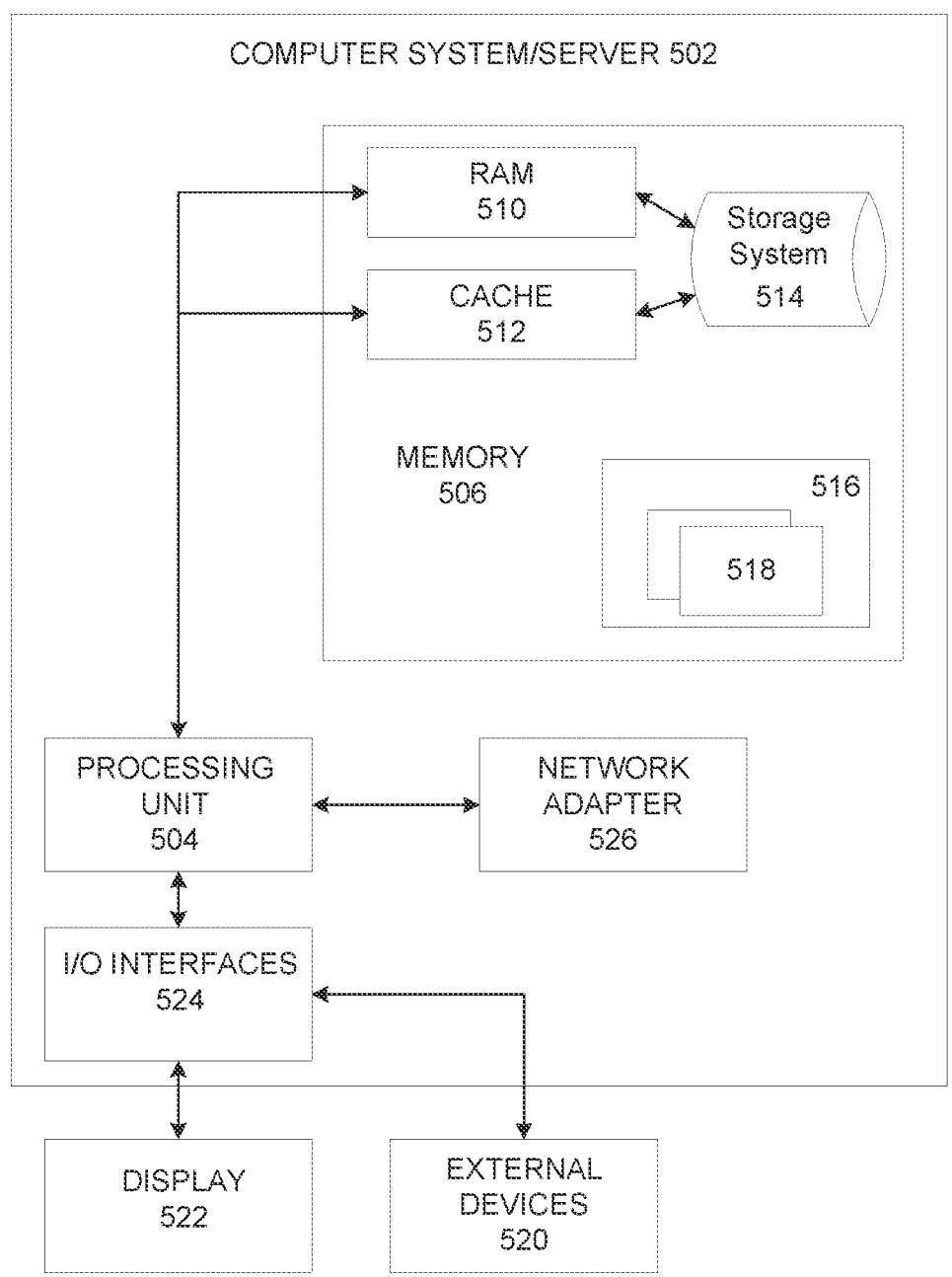
FIG. 5 is a diagram illustrating a computer system configured to support one or more of the example embodiments.

FIG. 5 is not intended to suggest any limitation as to the scope of use or functionality of embodiments of the application described herein. Regardless, the computing node 500 is capable of being implemented and/or performing any of the functionality set forth hereinabove. For example, the computing node 500 may be a network server of a larger enterprise network that connects multiple user workstations to the Internet, a private network, or the like.

In computing node 500 there is a computer system/server 502, which is operational with numerous other general purpose or special purpose computing system environments or configurations. Examples of well-known computing systems, environments, and/or configurations that may be suitable for use with computer system/server 502 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 502 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 502 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 502 in cloud computing node 500 is shown in the form of a general-purpose computing device. The components of computer system/server 502 may include, but are not limited to, one or more processors or processing units (processor) 504, a system memory 506, and a bus that couples various system components including the system memory 506 to the processor 504.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 502 typically includes a variety of computer system readable media. Such media may be any available media that is accessible by computer system/server 502, and it includes both volatile and non-volatile media, removable and non-removable media. System memory 506, in one embodiment, implements the flow diagrams of the other figures. The system memory 506 can include computer system readable media in the form of volatile memory, such as random-access memory (RAM) 510 and/or cache memory 512. Computer system/server 502 may further include other removable/non-removable, volatile/non-volatile computer system storage media. By way of example only, storage system 514 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 506 may include at least one program product having a set (e.g., at least one) of program modules that are configured to carry out the functions of various embodiments of the application.

Program/utility 516, having a set (at least one) of program modules 518, may be stored in memory 506 by way of example, and not limitation, as well as an operating system, one or more application programs, other program modules, and program data. Each of the operating system, one or more application programs, other program modules, and program data or some combination thereof, may include an implementation of a networking environment. Program modules 518 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 502 may also communicate with one or more external devices 520 such as a keyboard, a pointing device, a display 522, etc.; one or more devices that enable a user to interact with computer system/server 502; and/or any devices (e.g., network card, modem, etc.) that enable computer system/server 502 to communicate with one or more other computing devices. Such communication can occur via I/O interfaces 524 (which may be referred to herein as an output and/or an input). Still yet, computer system/server 502 can communicate with one or more networks such as a local area network (LAN), a general wide area network (WAN), and/or a public network (e.g., the Internet) via network adapter 526. As depicted, network adapter 526 communicates with the other components of computer system/server 502 via a bus. It should be understood that although not shown, other hardware and/or software components could be used in conjunction with computer system/server 502. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. An apparatus comprising:
a processor configured to
receive structured query language (SQL) queries from a software application;
convert the received SQL queries into syntax trees,
identify a subset of SQL queries from among the received SQL queries which are duplicate SQL queries based on the converted syntax trees in comparison to syntax trees of known SQL queries, and
remove the duplicate subset of SQL queries from the received SQL queries; and
a network interface configured to transmit remaining SQL queries included in the received SQL queries to a remote computing system for anomaly detection of data within the remaining SQL queries.

2. The apparatus of claim 1, further comprising a memory configured to store the syntax trees of the known set of SQL queries.

3. The apparatus of claim 1, wherein the processor is configured to convert an SQL query from the subset of SQL queries into a syntax tree based on a predefined template and transmit information about the syntax tree to the remote computing system instead of the SQL query.

4. The apparatus of claim 3, wherein the processor is further configured to transmit an identifier of the template and one or more dynamic parameters included in the SQL query to the remote computing system.

5. The apparatus of claim 3, wherein the processor is configured to select the predefined template from among a plurality of predefined templates based on a structure of the identified SQL query.

6. The apparatus of claim 1, wherein the processor is configured to disable a session with the software application in response to identifying the subset of SQL queries.

7. The apparatus of claim 1, wherein the processor is further configured to compress commands from the identified subset of SQL queries into parameter values and control the network interface to transmit the compressed parameter values to the remote computing system.

8. A method comprising:
receiving structured query language (SQL) queries from a software application;
converting the received SQL queries into syntax trees;
identifying a subset of SQL queries from among the received SQL queries which are duplicate SQL queries based on the converted syntax trees in comparison to syntax trees of a known set of SQL queries;
removing the duplicate subset of SQL queries from the received SQL queries; and
transmitting remaining SQL queries included in the received SQL queries to a remote computing system for anomaly detection of data within the remaining SQL queries.

9. The method of claim 8, wherein the method further comprises storing the syntax trees of the known set of SQL queries in memory.

10. The method of claim 8, wherein the identifying comprises converting an SQL query from the subset of SQL queries into a syntax tree based on a predefined template and the transmitting comprises transmitting information about the syntax tree to the remote computing system instead of the SQL query.

11. The method of claim 10, wherein the transmitting comprises transmitting an identifier of the template and one or more dynamic parameters included in the SQL query to the remote computing system.

12. The method of claim 10, wherein the method further comprises selecting the predefined template from among a plurality of predefined templates based on a structure of the identified SQL query.

13. The method of claim 8, wherein the method further comprises disabling a session with the software application in response to identifying the subset of SQL queries.

14. The method of claim 8, wherein the method further comprises compressing commands from the identified subset of SQL queries into parameter values and transmitting the compressed parameter values to the remote computing system.

15. A non-transitory computer-readable medium comprising instructions which when executed by a processor cause a computer to perform a method comprising:
receiving structured query language (SQL) queries from a software application;
converting the received SQL queries into syntax trees;
identifying a subset of SQL queries from among the received SQL queries which are duplicate SQL queries based on the converted syntax trees in comparison to syntax trees of a known set of SQL queries;
removing the duplicate subset of SQL queries from the received SQL queries; and
transmitting remaining SQL queries included in the received SQL queries to a remote computing system for anomaly detection of data within the remaining SQL queries.

16. The computer-readable medium of claim 15, wherein the method further comprises storing the syntax trees of the known set of SQL queries in memory.

17. The computer-readable medium of claim 15, wherein the identifying comprises converting an SQL query from the subset of SQL queries into a syntax tree based on a predefined template and the transmitting comprises transmitting an identifier of the syntax tree to the remote computing system instead of the SQL query.

18. The computer-readable medium of claim 17, wherein the transmitting comprises transmitting an identifier of the template and one or more dynamic parameters included in the SQL query to the remote computing system.

* * * * *